3,256,153
METHOD OF STABILIZING WAX-FAT COATING
MATERIALS AND PRODUCT THEREOF
Kenneth R. Heimlich, Ambler, Pa., assignor to Smith
Kline & French Laboratories, Philadelphia, Pa., a corporation of Pennsylvania
No Drawing. Filed Feb. 8, 1963, Ser. No. 257,082
11 Claims. (Cl. 167—82)

This invention relates to a method of stabilizing waxy coating materials used for coating of discrete solids. More particularly this invention relates to a method for stabilizing the wax or fat coatings used in the production of pharmaceutical forms such as pellets, pills, tablets and the like.

It has been the recent trend in the pharmaceutical industry to provide prolonged therapeutic action after oral aministration of the medication. The most popular method of preparing the oral sustained release dosage form has been through tablets or encapsulated pellets. The sustained release or prolonged action of these products are accomplished by coating them with or embedding them in fats and waxes. One of the problems encountered with these sustained release wax and fat coatings is that after standing for a short period of time at room temperature the pellets or tablets lose their original waxy gloss and luster and begin to fade. The product then loses the much desired pharmaceutical elegance. The change in appearance upon aging is due primarily to surface crystallization. This change is manifested by a typical hazy appearance or frosting. This phenomenon is not only noticeable in the pharmaceutical industry with wax-fat coated sustained release pellets and tablets but also evident in the candy industry. A parallel case being the frosting or whitening which is known as sugar bloom formation which occurs upon aging of chocolate candy.

It is therefore the object of this invention to provide a novel method which prevents the surface crystallization upon aging which leads to hazing, frosting or fading of discrete solids containing wax-fat material.

The method in accordance with this invention prevents the fading, frosting or hazing of pellets and tablets upon aging which are substantially coated with wax-fat compounds. The novel and inexpensive method as disclosed hereinafter permits the products to maintain their original luster and gloss and therefore also maintain their pharmaceutical elegance after prolonged storage at room temperature.

The method of this invention comprises preparing a finish coating solution comprising a solid polyethylene glycol and polyvinylpyrrolidone in a suitable organic solvent in which they are sufficiently soluble. The discrete solids containing the wax-fat compounds, by way of specific illustration, sustained release pharmaceutical pellets and tablets, are placed in a coating pan and rotated. The coating solution is then sprayed on the discrete solids as they revolve in the coating pan in an amount to cover the solids. This method distributes evenly a coating onto the wax-fat material which prevents or cures surface crystallization.

In accordance with this invention the solid polyethylene glycol may be those ranging in molecular weights of from about 1000 to about 10,000. The advantageous and preferred solid polyethylene glycols will contain a molecular weight of from about 2000 to about 6000.

Exemplary of the polyvinylpyrrolidone employed in the method and product of this invention may be those varieties outlined in the brochure entitled Polyvinylpyrrolidone, published by the General Aniline & Film Corporation or in The Merck Index.

The total solid contents of the coating solution may range from about 3% to about 18%. Preferably the total solid content of the solution will range from about 5% to about 12%. The ratio of the solid polyethylene glycol to the polyvinylpyrrolidone in the solution is from about 1:1 to about 9:1, advantageously from 2:1 to about 6:1.

The "wax-fat compounds" mentioned above as non-toxic, solid sustained release material may be, for example, a wax, a fatty acid, alcohol or ester, alone or an admixture thereof or metallic salts of fatty acids.

In accordance with this invention the organic solvent is any pharmaceutically acceptable volatile solvent in which the solid polyethylene glycol and polyvinylpyrrolidone are substantially soluble. Exemplary of such solvents would be acetone, chloroform, carbon tetrachloride, petroleum ether, benzene, toluene, xylene, methyl ethyl ketone, trichloroethylene, ethylene dichloride; mixtures such as, trichloroethane-methylene chloride and alcohols, such as, methyl, ethyl and isopropyl or mixtures of the above solvents.

It is preferred to have the coating from about 0.25% to about 5% and advantageously from about 1% to about 3% by weight of the finished pellets or tablets.

The discrete solids which are coated using this novel procedure comprise tablets, pellets, pills and the like substantially completely coated with a wax-fat compound which in turn has a finishing coat of polyethylene glycol and polyvinylpyrrolidone thereon. The finishing coat is from about 0.25% to about 5% and preferably from about 1% to about 3% by weight of the discrete solids.

It will be evident to those skilled in the pharmaceutical art that methods of apply the polyethylene glycol-polyvinylpyrrolidine coating solution equivalent to that described hereinbefore could be used as, for example, using air suspension or fluid bed coating methods in lieu of the coating pan. It will also be apparent that the sustained release fatty material could be coated on the pellets, the medicament embedded in the wax by forming a melt of the wax and then prilling or coating medicament granules which can be used as such or tableted.

The following examples are not limiting but rather are illustrative of the method of this invention.

*Example 1*

Ingredients: W./v., percent
  Polyethylene glycol 6000 _____ 5
  Polyvinylpyrrolidone _____ 2
  S.D. alcohol #30 _____ 10
  Trichloroethylene, q.s. _____ 100

A finishing coating solution is prepared by dissolving the polyvinylpyrrolidone in the alcohol and adding this to a solution of the polyethylene glycol 6000 in trichloroethylene.

The coating solution is then sprayed onto a regular commercial run of sustained release chlorpromazine hydrochloride pellets rotating in a coating pan and which have been previously coated with a wax-fat mixture of glyceryl monostearate, glyceryl distearate and white wax. The spraying is continued until a 0.5% increase in weight of the pellets is accomplished. The pellets are permitted to rotate until dry.

*Example 2*

Ingredients: W./v., percent
  Polyethylene glycol 4000 _____ 8
  Polyvinylpyrrolidone _____ 1
  Petroleum ether, q.s. _____ 100

A finishing coating solution is prepared by dissolving the polyethylene glycol 4000 and polyvinylpyrrolidone in the petroleum ether.

Pellets containing chlorprophenpyridamine maleate which have previously been given a sustained release coating of castorwax and ethyl cellulose are placed in a rotating coating pan. The finishing coating solution of polyethylene glycol and polyvinylpyrrolidone is applied until the pellets are substantially completely coated. The pellets are permitted to rotate until dry.

What is claimed is:

1. The method of stabilizing the surface appearance of discrete solids which have their surfaces substantially completely coated with wax-fat material which comprises covering said discrete solids rotating in a coating pan with a coating solution comprised of solid polyethylene glycol and polyvinylpyrrolidone in a pharmaceutically acceptable volatile solvent.

2. The method of claim 1 characterized in that the solid polyethylene glycol has an average molecular weight of about 6000.

3. The method of claim 1 characterized in that the ratio of the solid polyethylene glycol to the polyvinylpyrrolidone is from about 2:1 to about 6:1.

4. The method of stabilizing the surface appearance of sustained release pharmaceutical pellets substantially completely coated with wax-fat material which comprises covering said sustained release pharmaceutical pellets rotating in a coating pan with a coating solution comprised of solid polyethylene glycol and polyvinylpyrrolidone in a pharmaceutically acceptable volatile solvent.

5. The method of claim 4 characterized in that the solid polyethylene glycol has an average molecular weight of about 6000.

6. The method of claim 4 characterized in that the ratio of the solid polyethylene glycol to the polyvinylpyrrolidone is from about 2:1 to about 6:1.

7. A pharmaceutical pellet having a stabilized surface appearance comprising a medicament containing core substantially completely surrounded by a wax-fat coating said wax-fat coating in turn having a finishing coat thereon of polyethylene glycol and polyvinylpyrrolidone.

8. The pharmaceutical pellet of claim 2 characterized in that the ratio of polyethylene glycol to the polyvinylpyrrolidone is from about 2:1 to about 6:1.

9. The pharmaceutical pellet of claim 7 characterized in that the finishing coat is from about 1% to about 3% by weight of said form.

10. A pharmaceutical tablet having a stabilized surface appearance comprising a medicament containing core substantially completely surrounded by a wax-fat coating said wax-fat coating in turn having a finishing coat thereon of polyethylene glycol and polyvinylpyrrolidone.

11. A pharmaceutical pill having a stabilized surface appearance comprising a medicament containing core substantially completely surrounded by a wax-fat coating said wax-fact coating in turn having a finishing coat thereon of polyethylene glycol and polyvinylpyrrolidone.

References Cited by the Examiner

UNITED STATES PATENTS

| | | | |
|---|---|---|---|
| 2,887,438 | 5/1959 | Cooper et al. | 167—82 |
| 2,918,411 | 12/1959 | Hill | 167—82 |
| 2,921,883 | 1/1960 | Reese et al. | 167—82 |
| 2,954,322 | 9/1960 | Heilig et al. | 167—82 |
| 2,991,226 | 7/1961 | Millar et al. | 167—82 |
| 3,041,243 | 6/1962 | Sugimoto et al. | 167—82 |
| 3,096,248 | 7/1963 | Rudzki | 167—82 |

JULIAN S. LEVITT, *Primary Examiner.*

FRANK CACCIAPAGLIA, Jr., *Examiner.*

GEORGE A. MENTIS, *Assistant Examiner.*